United States Patent Office 3,812,195
Patented May 21, 1974

3,812,195
PREPARATION OF DIMETHYL BERYLLIUM
Roy J. Laran, Greenwell Springs, and Paul Kobetz, Baton Rouge, La., and Robert W. Johnson, Jr., Savannah, Ga., assignors to Ethyl Corporation, Richmond, Va.
No Drawing. Original application Apr. 23, 1965, Ser. No. 451,694. Divided and this application Apr. 26, 1967, Ser. No. 651,333
Int. Cl. C07f 3/00
U.S. Cl. 260—665 R          1 Claim

ABSTRACT OF THE DISCLOSURE

A process of reacting aluminum trialkyls or alkali metal aluminum tetraalkyls with a beryllium halide to form a beryllium dialkyl, which may be pyrolyzed to form beryllium hydride, is disclosed. Beryllium hydride is a fuel component of solid propellants and also a source of hydrogen and of pure beryllium metal.

This is a division of our prior copending application Ser. No. 451,694 filed Apr. 23, 1965.

This invention relates to a novel process for the preparation of beryllium hydride. More specifically, it relates to a process wherein a beryllium alkyl is prepared by a novel method and, without separation from the reaction system, is pyrolyzed to produce beryllium hydride.

Beryllium hydride has been synthesized by Coates and Glockling [J. Chem. Soc. 1954, 2526] by the pyrolysis of ditertiary butylberyllium etherate and by Head, Holley and Rabideau [J. Am. Chem. Soc. 79 3687 (1957)] using ether-free ditertiary butylberyllium. More recently, a superior product has been obtained by the pyrolysis of ditertiary butylberyllium etherate dissolved in a high-boiling inert solvent (co-pending application Ser. No. 176,865, filed Feb. 26, 1962).

An object of this invention is the provision of a novel and improved method for the preparation of beryllium hydride. Another object of this invention is the provision of a method for the preparation of beryllium hydride which is characterized by simplicity and rapidity of operation. Still another object of this invention is the provision of a method for the preparation of beryllium hydride from beryllium halide which does not require the isolation of a beryllium alkyl intermediate. Other objects will appear hereinafter.

In accordance with the present invention it has been found that beryllium hydride can be prepared conveniently and rapidly by means of a two-stage process without separation, between the stages, of intermediate reaction products. In the first stage an organoaluminum compound, specifically an aluminum trialkyl or an alkali metal aluminum tetraalkyl, wherein the alkali metal has an atomic number of 3 through 55 and wherein the alkyl group contains from 4 to 10 carbon atoms, inclusive, is caused to react with a beryllium halide to form the corresponding beryllium dialkyl. In the second stage, the reaction product of the first stage is heated without further treatment to decompose thermally the beryllium dialkyl contained therein to beryllium hydride. The foregoing procedure represents an embodiment of the present invention.

Another embodiment of the present invention is the use of a butyl aluminum compound in the reaction of the first stage of the process. A preferred embodiment of the present invention is the use of sodium aluminum tetra(n-butyl), sodium aluminum tetra(isobutyl), tri - n - butyl aluminum or triisobutyl aluminum in the reaction of the first stage, because when the named compounds are used the reaction of the first stage occurs at a temperature well below that of the thermal decomposition of the beryllium alkyl intermediate.

Another preferred embodiment is the use in the first stage of a solvent boiling in the range of from about 50 to about 125° C., for example, toluene, and in the second stage a solvent boiling in the range of about 150 to about 220° C., for example, dodecane. These solvent ranges are preferred because their use assures that the formation of beryllium alkyl is essentially complete before it begins to decompose thermally. This order of operation is highly desirable if high yield and purity are to be obtained.

The process of the present invention exhibits a number of distinct advantages over previously known methods for the preparation of beryllium hydride. Previous methods required the separation of beryllium alkyl from a reaction mixture containing, in addition, aluminum chloride or excess aluminum alkyl. Since both aluminum and beryllium alkyls are highly reactive and flammable in air, the separation of the beryllium alkyl from the reaction mixture and its transfer to the pyrolysis vessel were operations requiring great care in manipulation and the use of an inert atmosphere. These hazardous operations are eliminated by the process of the present invention. In addition to improvements in safety, the process of the present invention results in a marked increase in the speed of operation because of the large saving in time accompanying the elimination of the separation and transfer steps.

The invention will be more fully understood by reference to the following set of illustrative examples in which all parts and percentages are by weight.

EXAMPLE I

A mixture of 10 parts of beryllium chloride bis(diethyl etherate) and 24 parts of triisobutyl aluminum was heated at 50° C. for 30 minutes; a small amount (25 parts) of diethyl ether was then added. This mixture was then introduced over a period of about 30 minutes into a high-boiling kerosene ("Bayol D") maintained at a temperature of about 190–195° C. After addition was complete, the mixture was cooled and filtered. The residue on the filter was washed several times with pentane and dried. Analysis of the product by acid hydrolysis and measurement of the evolved hydrogen indicated beryllium hydride of a purity of about 72 percent.

When dodecane or tetralin was used in place of the high boiling kerosene, similar results were obtained.

EXAMPLE II

Sodium aluminum tetraisobutyl (16.7 parts) and 6.8 parts of beryllium chloride bis-diethyl etherate were combined in 25 parts of toluene. The sodium chloride precipitated rapidly from the mixed solutions. The sodium chloride was separated by filtration and was washed on the filter with successive small portions of toluene and ether. White oil (100 parts) was heated to 220° C. and the combined filtrate and washings obtained as indicated above were added slowly to the hot oil. The heating was continued for an additional 10 minutes, after which the mixture was cooled and filtered. The beryllium hydride on the filter was washed with hexane and dried under vacuum. A sample of the product was analyzed by acid hydrolysis and was shown to contain approximately 55 percent of beryllium hydride.

When the sodium aluminum tetraisobutyl of Example II is replaced by sodium aluminum tetra-n-butyl, similar results are obtained.

EXAMPLE III

Twenty-five parts of triisobutyl aluminum and 4 parts of powdered anhydrous beryllium chloride were heated together at 50° C. for one hour. After the addition of 50 parts of benzene, the mixture was boiled for two hours under reflux. About three quarters of the beryllium chloride reacted. The benzene was removed under vacuum, and the residue was introduced into Bayol D at 190–200° C. The resulting mixture was filtered, and the residue was washed with hexane and dried. Hydrolytic analysis indicated beryllium hydride of 70.5 percent purity.

When the triisobutyl aluminum of Example III is replaced by tri-n-butyl aluminum, similar results are obtained.

EXAMPLE IV

Sodium aluminum tetramethyl (22 parts) and 23 parts of beryllium chloride bis-diethyl etherate are combined in 50 parts of ether. Sodium chloride precipitates rapidly from the mixed solutions. The sodium chloride is separated by filtration and is washed on the filter with successive small portions of ether. The combined filtrate and washings are treated with approximately their own volume of hexane. Dimethylberyllium separates out as colorless needles, which are washed with a small quantity of hexane and dried.

When the sodium aluminum tetramethyl of Example IV is replaced by the corresponding potassium, rubidium or cesium compound, similar results are obtained.

As indicated above, the original reactants or raw materials employed in the proces of this invention are an organoaluminum compound and a beryllium halide. The organoaluminum compound employed may be selected from a rather broad range of compounds varying widely in composition. For example they may include trialkyl aluminum compounds and alkali metal aluminum tetraalkyl compounds. In both series of compounds the number of carbon atoms in each alkyl group can vary from 4 to 10 or more. Compounds containing alkyl groups with more than 10 carbon atoms, while operable to some extent, are more difficult to decompose than those with fewer carbon atoms. Examples of the organoaluminum reactants include tri-n-butyl aluminum, tri-isobutyl aluminum, tri-tertiary amyl aluminum, triisohexyl aluminum, tri-n-decyl aluminum, tris(2-ethylhexyl)aluminum, sodium aluminum tetraisobutyl, sodium aluminum tetra-n-butyl, lithium aluminum, tetra-n-hexyl, potassium aluminum tetraisooctyl, rubidium aluminum tetradecyl and cesium aluminum tetraheptyl.

The beryllium halide reactants may contain any of the halogens and may be etherated or unetherated. Examples include beryllium fluoride, beryllium chloride, beryllium bromide, beryllium iodide, beryllium fluoride bis-dimethyl etherate, beryllium chloride bis-diethyl etherate, beryllium bromide bis-di-n-butyl etherate and beryllium iodide bis-diisopropyl etherate. Mixtures of beryllium halide reactants are also suitable.

In the process of this invention, the ratio of the reactants can be varied within wide limits, namely, from a 100 percent or greater excess (over the stoichiometric equivalent) of the organoaluminum compound to a 100 percent or greater excess of beryllium halide. Normally, an approximately stoichiometric ratio of the reactant is used.

The reaction temperatures employed in the process of the invention must obviously be higher in the second stage wherein beryllium alkyl is decomposed than in the first stage wherein the same compound is formed. In the first stage, therefore, the generally useful temperatures range from about 50 to about 125° C. and in the second stage from about 150 to 220° C. Temperatures of from about 60 to about 100° C. and from about 160 to 210° C., respectively, are preferred.

The reaction pressure, for ease in control, is normally about atmospheric but pressures ranging from 1/10 atmosphere or less to 100 atmospheres or more may be employed if desired.

The first or beryllium alkyl formation stage of the process of the present invention may be carried out in the absence of a solvent or in the presence of a low-boiling or a high-boiling aliphatic or aromatic hydrocarbon solvent. The second or pyrolysis stage is normally carried out in a high-boiling aliphatic or aromatic hydrocarbon. The low-boiling solvents are saturated aliphatic, cycloaliphatic and aromatic hydrocarbons boiling, at atmospheric pressure, in the approximate range of 80 to 170° C. Examples include 2,3-dimethyl hexane, isooctane, cyclohexane, methylcyclohexane, dimethyl cyclohexane, toluene, xylene, ethyl benzene, propyl benzene, cumene, mesitylene, and mixtures of the foregoing, such as petroleum naphtha, gasoline fractions and kerosene. The high-boiling solvents are saturated aliphatic or aromatic hydrocarbons boiling above 170° C. These solvents include n-decane, n-undecane, n-tridecane, n-tetradecane, n-pentadecane, cetane, propylcycloheptane 1,3-dimethylcyclohexane, 1-methyl-2-isoamyl cyclohexane, 1,3-dimethyl-5-isobutylcyclohexane, hemimellitene, prehnitene, isodurene, n-butyl benzene, p-cymene, and 1,3,5-triethyl benzene, or mixtures of any of the foregoing.

The reactions of this invention may be carried out under any atmosphere inert to both the reactants and products but dry nitrogen is preferred. Other suitable protective atmospheres include hydrogen, carbon monoxide, helium, neon, argon, krypton, and xenon.

The product of this invention is a white to grayish white powder which has strong reducing properties. The bulk of the product is insensitive to water and air, although a small amount of hydrolysis (of the order of 10 percent) does occur upon contact with water. When heated in an inert atmosphere, the product is stable up to a temperature of about 160° C.

The beryllium hydride product of this invention is of great value as a fuel component of solid propellants. It also represents a convenient source of small storeable quantities of hydrogen and of pure beryllium metal.

I claim:

1. The process for the preparation of dimethyl beryllium which comprises reacting, in diethyl ether, an alkali metal aluminum tetramethyl wherein the akali metal has an atomic number from 11 to 55, inclusive, with beryllium chloride, separating the insoluble alkali metal chloride by-product by filtration, precipitating dimethyl beryllium from the filtrate by addition of hexane and separating and purifying the precipitated dimethyl beryllium.

References Cited

Everest: The Chemistry of Beryllium, vol. I, Elsevier Pub. Co., New York, 1964, pp. 91 to 101.

Wood et al.: J. Electrochem. Soc., vol. 104, pp. 29 to 37 (1957).

LELAND A. SEBASTIAN, Primary Examiner

U.S. Cl. X.R.

149—109